Oct. 14, 1930.  V. S. DURBIN  1,778,524
CUPOLA FURNACE AND METHOD OF OPERATING THE SAME
Filed Feb. 11, 1929
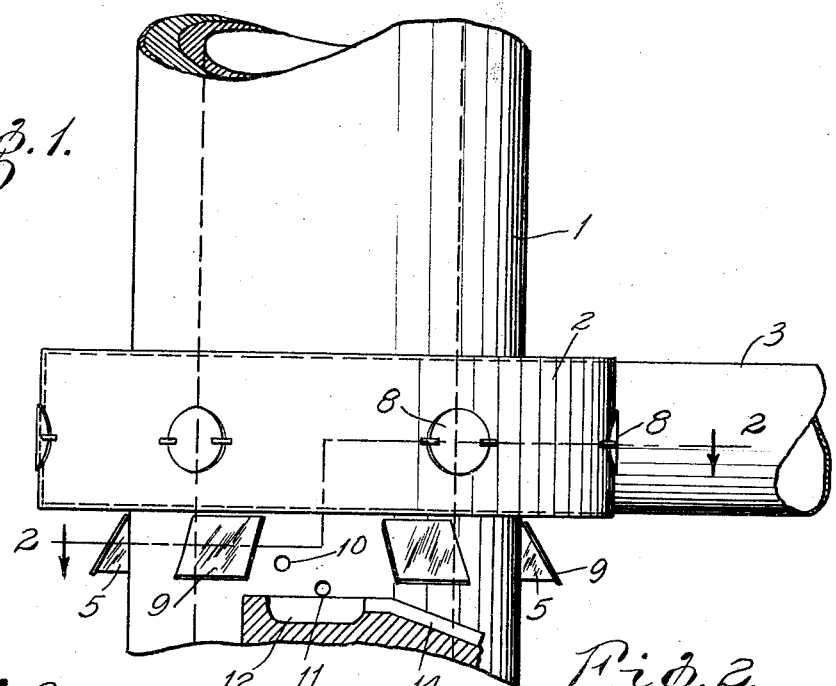
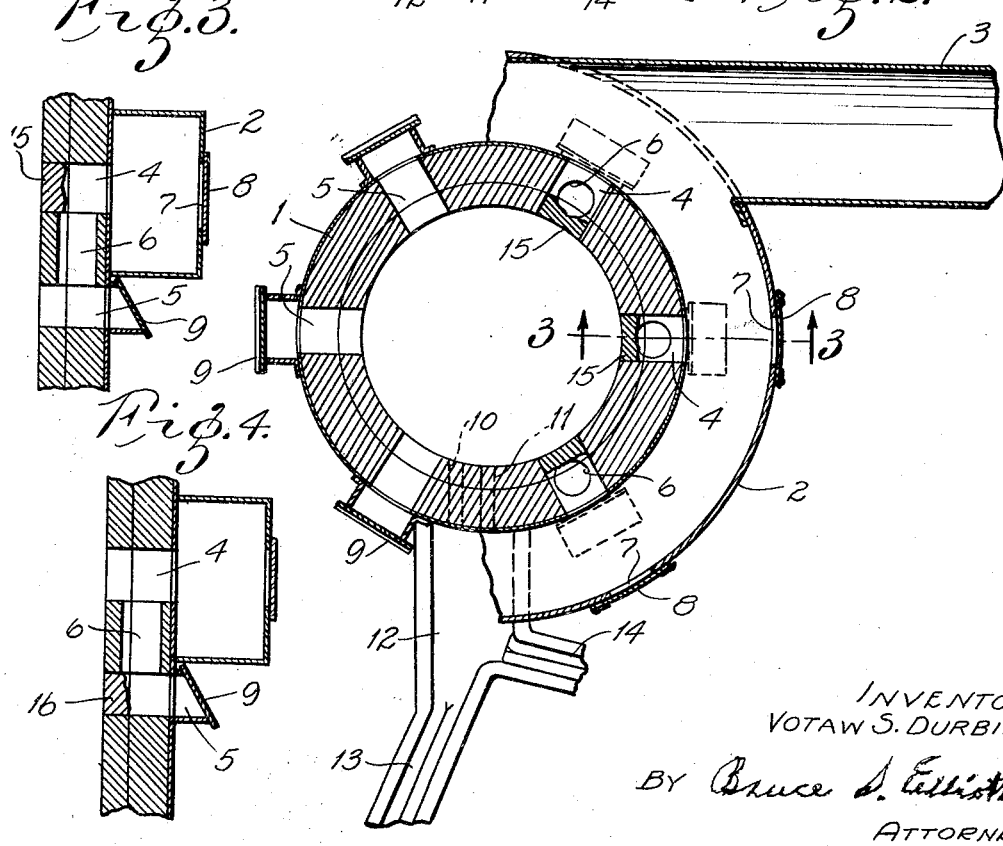
INVENTOR
VOTAW S. DURBIN
BY Bruce S. Elliott
ATTORNEY.

Patented Oct. 14, 1930

1,778,524

UNITED STATES PATENT OFFICE

VOTAW S. DURBIN, OF ST. LOUIS, MISSOURI

CUPOLA FURNACE AND METHOD OF OPERATING THE SAME

Application filed February 11, 1929. Serial No. 339,104.

This invention relates to a novel method of running a series of heats in a cupola furnace without removing from the furnace the slag remaining after each heat.

The general object of the invention is accomplished by first running a heat and removing the molten metal and the slag that flows therewith from the furnace, then running a second heat with the material therefor superimposed upon the slag remaining in the furnace, whereby said slag will be rendered molten, then removing the molten metal with the slag that flows therewith from the furnace, and repeating the foregoing operations.

More specifically stated, the invention is practiced by first running a heat with the upper of the two conventional tuyères closed, the draft being applied through the lower tuyère; then removing the molten metal and the slag that flows therewith from the furnace; then running a second heat with the lower tuyère closed and the draft applied through the upper tuyère only, so that it can enter the furnace above the surface of the slag remaining in the furnace, whereby said slag will, in the course of the heating, be itself rendered molten; then removing the molten metal and the slag that flows therewith from the furnace; and running successive heats with the draft applied through the upper tuyères and the lower tuyères maintained closed.

The operation of the method depends upon the fact that the molten slag is lighter than the molten metal and will always float on top of the metal, so that with each heat after the first, a sufficient amount of the slag will always be removed from the furnace to prevent the accumulation of slag after the run from rising to the height of the upper tuyères.

In order that the practice of my improved method may be better understood, I have shown in the accompanying drawing sufficient of the construction of a conventional cupola furnace to illustrate the methods of operation.

In the drawing—

Figure 1 is a view in broken elevation of the lower portion of a cupola furnace, the trough for conveying away the molten metal being shown in section;

Figure 2 is a sectional plan view on the line 2—2 of Fig. 1;

Figure 3 is a cross-sectional view on the line 3—3 of Fig. 2, with the upper tuyère closed; and Figure 4 is a similar view with the upper tuyère opened and the lower tuyère closed.

Referring now to the drawing, the numeral 1 indicates the lower portion of a cupola furnace which, as usual, is surrounded by an air drum 2 connected with a blast pipe 3. The numerals 4 indicate a series of upper tuyères located at intervals around the circumferential side of the cupola, six of such tuyères being shown, and the numeral 5, indicates a similar number of lower tuyères. Each upper and lower tuyère are connected by means of a vertical passage 6. The air drum 2 encloses the upper series of tuyères 4 and is provided with an opening 7 normally closed by a door 8 opposite each of the tuyères 4. The purpose of these openings is to afford access to the tuyères 4 to stop up or open the same, as hereinafter described.

Each of the lower series of tuyères 5 extends outwardly beyond the wall of the furnace, as shown in Figs. 3 and 4, and is normally closed by a door 9. At the front of the furnace, I provide two openings 10, 11, respectively (Fig. 1), located one above the other and slightly separated in a lateral direction. Below these openings is located a basin 12 for receiving molten metal and slag discharged through one or the other of the openings 10, 11 from the furnace, leading from which basin is a trough 13 (Fig. 2) for conveying molten metal to the air furnace, and a laterally directed trough 14 for conveying away slag from the basin 12. This construction is described and illustrated in my pending application Ser. No. 296,124, filed July 30th, 1928, and need not be more particularly described as, of itself, it forms no part of the present invention.

Of the features above described, the provision of the openings 10, 11 and of the closable opening 7 in the air drum 2 are believed to be novel.

In practicing my improved method, before charging the furnace, the doors 8 are opened and the upper series of tuyères 4 are closed by being plugged with clay, or the like, indicated in Fig. 3 by the numeral 15. The openings 7 in the air drum are then closed, the furnace charged with alternating layers of metal and coke in the usual manner, ignition is started, and blast is applied through the lower tuyères 5 from the pipe 3 and air drum 2. It should be stated that the openings 10, 11 are also plugged at the starting. After the metal has had time to melt, it is allowed to accumulate until it will run out of the upper opening 10, which is determined by unstopping this opening at intervals. When the metal begins to flow out of the opening 10, it is allowed to run for a short time to heat the basin 12 and troughs 13 and 14, and also to permit the slag floating on top of the molten metal to run out. The opening 10 is then closed and the opening 11 unstopped, and the entire body of molten metal and such slag as may flow therewith is allowed to run out of this opening. The slag is diverted into the trough 14 and practically only pure molten metal runs through the trough 13.

After the above operation, in the ordinary practice of operating cupola furnaces, the furnace would be allowed to cool, its bottom opened, and the slag, some of which always remains and hardens, is removed. According to my invention, I obviate the necessity of this operation, and run a second heat immediately after the first heat in the following manner:

After the metal is run from the furnace, I again open the doors 8 and remove the plugs 15 from the tuyères 4 and then open the doors 9 and place plugs 16 in the lower tuyères 5, as shown by Fig. 4. The furnace is then again charged, the material being superimposed upon the body of slag remaining in the furnace, and blast applied as before, the air now entering the furnace through the upper tuyères 4. The reason for this operation is that the slag remaining in the furnace will extend above the level of and substantially close the lower tuyères 5 and it would ordinarily be impossible to produce a draft through these tuyères. The blast is continued not only until the metal begins to melt, but until the molten metal flowing to the bottom of the furnace has had opportunity to render moulten the body of slag in the bottom of the furnace, which then rises and floats upon the top of the molten metal. The opening 10 is then unstopped and some of the metal and the major portion of the slag permitted to escape therefrom. After this, the opening 10 is stopped and the opening 11 unstopped and the molten metal, substantially free from slag, is permitted to run out, the remainder of the slag running out with it. After the second heat is run, there will remain in the bottom of the cupola a quantity of slag equal to that remaining after the first heat, which of course would render the use of the lower tuyères impossible. All subsequent heats, therefore, are run with the use of the upper tuyères only, until the furnace is shut down long enough to permit the bed coke to burn up, or until the number of heats run renders it necessary to repair the walls of the furnace. Usually an interval of three, or even four hours can intervene between the heats, without burning up the bed coke, or rendering it necessary to drop the bottom.

The above operations may be continued almost indefinitely, so that instead of being able to run only one heat in the course of a day, which is the usual practice, I can run from four to five heats in a twelve hour period. By this means, I am able to provide a constant supply of molten metal for use by the molders, so that the operation of casting may be a continuous one instead of an intermittent one, as is now generally the case. It will be apparent to those skilled in the art that the reason for beginning the initial operation with the draft applied through the lower set of tuyères is in order to provide, and thereafter maintain, a hot bed at the bottom of the furnace. Otherwise, with the use of the upper set of tuyères, the molten metal would have to run through a bed of relatively cold material and would chill or "freeze" on the bottom of the furnace. The fuel bed at the bottom is, of course, maintained by the fresh layers of coke between the different charges of metal as successive charges are placed in the cupola. In actual operation, I have succeeded in effecting very large savings in time and labor in the foundry in which my invention is being used and have likewise enormously increased the output over what was possible with the same equipment operated in the usual way.

I claim:

1. The method of melting metal in a cupola furnace having two sets of tuyères at its lower end located at different heights, which consists in first running one heat with the upper set of said tuyères closed and then, without removing the remaining slag, running another heat with the lower set of tuyères closed and the upper set of tuyères opened.

2. The method of melting metal in a cupola furnace, which consists in running a heat while admitting a blast in the lower of two zones of application, and then, without removing the remaining slag, stopping the blast in the lower zone of application, and running a second heat with the blast applied in the upper zone of application.

3. In the art of melting metal, the method of running a series of heats in a cupola furnace without dropping the bottom thereof to remove the slag from the furnace between the heats, which consists in first running a heat with the draft applied in the lower only of two sets of tuyères, removing the molten metal and such slag as flows therewith from the furnace, then, running a second heat with draft applied in the upper set of tuyères, whereby the slag remaining in the furnace will be rendered molten, then removing the molten metal with the slag that flows therewith from the furnace, and thereafter running subsequent heats with the use of the upper set of tuyères only.

4. In the art of melting metal, the method of running a series of heats in a cupola furnace without dropping the bottom thereof to remove the slag from the furnace between the heats, which consists in first running a heat and removing the molten metal and the slag that flows therewith from the furnace, then running a second heat by applying a blast above the surface of the slag remaining in the furnace, whereby said slag will be rendered molten, then removing the molten metal with the slag that flows therewith from the furnace, and thereafter running subsequent heats by repeating the operations of the second heat.

In testimony whereof, I have hereunto set my hand.

VOTAW S. DURBIN.